(12) United States Patent
Okada (10) Patent No.: US 8,634,001 B2
(45) Date of Patent: Jan. 21, 2014

(54) IMAGE PROCESSING APPARATUS, IMAGE PROCESSING PROGRAM, IMAGE PROCESSING METHOD, AND IMAGE-PICKUP APPARATUS

(75) Inventor: Takashi Okada, Saitama (JP)

(73) Assignee: Canon Kabushiki Kaisha (JP)

( * ) Notice: Subject to any disclaimer, the term of this patent is extended or adjusted under 35 U.S.C. 154(b) by 142 days.

(21) Appl. No.: 13/404,060

(22) Filed: Feb. 24, 2012

(65) Prior Publication Data

US 2012/0218433 A1  Aug. 30, 2012

(30) Foreign Application Priority Data

Feb. 28, 2011 (JP) ................................ 2011-041730
Dec. 5, 2011 (JP) ................................ 2011-265702

(51) Int. Cl.
*H04N 9/07* (2006.01)
*H04N 5/225* (2006.01)
*H04N 5/217* (2011.01)
*G02B 13/16* (2006.01)

(52) U.S. Cl.
USPC .................... 348/241; 348/222.1; 348/335

(58) Field of Classification Search
USPC .............. 348/336, 222.1; 359/16, 637
See application file for complete search history.

(56) References Cited

U.S. PATENT DOCUMENTS

| 6,870,564 | B1 | 3/2005 | Burns | |
|---|---|---|---|---|
| 7,433,089 | B2 * | 10/2008 | Enomoto | 358/474 |
| 2008/0240709 | A1 * | 10/2008 | Nakamura | 396/529 |
| 2009/0263018 | A1 * | 10/2009 | Murakami et al. | 382/167 |
| 2010/0214446 | A1 * | 8/2010 | Watarai | 348/231.99 |
| 2011/0193997 | A1 * | 8/2011 | Hatakeyama | 348/241 |
| 2012/0212644 | A1 * | 8/2012 | Nashizawa | 348/223.1 |
| 2013/0039573 | A1 * | 2/2013 | Choi et al. | 382/165 |

FOREIGN PATENT DOCUMENTS

| JP | 2010-087672 A | 4/2010 |
|---|---|---|
| WO | 2006093266 A1 | 9/2006 |

\* cited by examiner

*Primary Examiner* — Tuan Ho
*Assistant Examiner* — Shahbaz Nazrul
(74) *Attorney, Agent, or Firm* — Rossi, Kimms & McDowell LLP (57) ABSTRACT

An image processing apparatus configured to process an image taken by an image-pickup unit includes a memory configured to store a relationship between a color shift amount at positions that are symmetrical with respect to an origin of an image and a blur amount relating to a curvature of field at the positions symmetrical with respect to the origin of the image, a detector configured to detect a color shift amount at the positions that are symmetrical with respect to the origin of the image, an acquirer configured to acquire the blur amount relating to the curvature of field corresponding to the color shift amount detected by the detector based on the relationship stored in the memory, and a processor configured to execute image processing that is asymmetrical with respect to the origin so as to correct the blur amount relating to the curvature of field acquired by the acquirer.

10 Claims, 5 Drawing Sheets

IMAGE PROCESSING APPARATUS, IMAGE PROCESSING PROGRAM, IMAGE PROCESSING METHOD, AND IMAGE-PICKUP APPARATUS

BACKGROUND OF THE INVENTION

1. Field of the Invention

The present invention relates to an image processing apparatus, an image processing program, an image processing method, and an image-pickup apparatus.

2. Description of the Related Art

Even in an optical system that is configured rotationally symmetrical around its optical axis, a lateral chromatic aberration that is rotationally asymmetrical may occur due to manufacturing scatterings of its lens and lens barrel. An aberrational component that is rotationally asymmetrical is referred to as a one-sided blur, and an improvement of the one-sided blur is demanded because the one-sided blur causes the image quality to degrade. One conventional method for improving the image quality detects a color shift amount of an image and executes image processing (International Publication No. WO06/093266 and U.S. Pat. No. 6,870,564). Japanese Patent Laid-Open No. ("JP") 2010-087672 discloses a method for improving the image quality using image restoration processing.

However, no prior art has proposed a method for effectively correcting a rotationally asymmetrical curvature of field through image processing. First of all, a one-sided blur of an aberrational component that cannot be detected as a color shift, such as the one-sided blur of the curvature of field, cannot be distinguished from the image.

SUMMARY OF THE INVENTION

The present invention provides an image processing apparatus and an image processing method which can obtain a high-quality image by correcting a rotationally asymmetrical curvature of field that occurs due to manufacturing scatterings.

An image processing apparatus according to the present invention configured to process an image taken by an image-pickup unit includes a memory configured to store a relationship between a color shift amount at positions that are symmetrical with respect to an origin of an image and a blur amount relating to a curvature of field at the positions symmetrical with respect to the origin of the image, a detector configured to detect a color shift amount at the positions that are symmetrical with respect to the origin of the image, an acquirer configured to acquire the blur amount relating to the curvature of field corresponding to the color shift amount detected by the detector based on the relationship stored in the memory, and a processor configured to execute image processing that is asymmetrical with respect to the origin so as to correct the blur amount relating to the curvature of field acquired by the acquirer.

Further features of the present invention will become apparent from the following description of exemplary embodiments with reference to the attached drawings.

DESCRIPTION OF THE EMBODIMENTS

Figure 1:
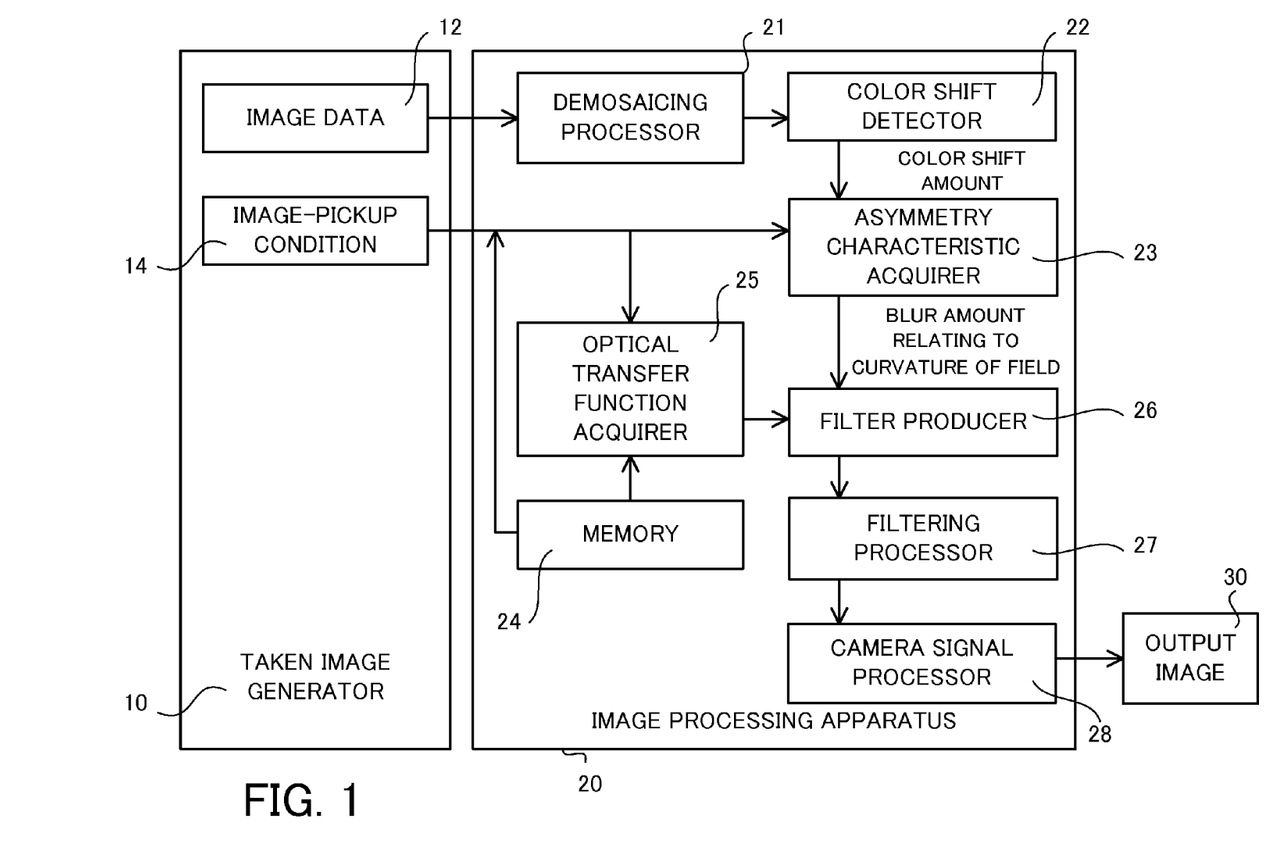
FIG. 1 is a block diagram of an image processing apparatus of this embodiment.

FIG. 1 is a block diagram of an image processing apparatus 20 according to this embodiment. The image processing apparatus 20 is connected to a taken image generator 10 configured to store image data and image-pickup condition (image-pickup information) 14 generated by photoelectrically converting an optical image formed by an image-pickup optical system of an image-pickup unit (not illustrated). The image processing apparatus 20 outputs as an output image 30 image data in which a one-sided blur of a curvature of field has been corrected through image processing.

In this embodiment, a curvature of field is an image-quality degraded component (aberration) to be corrected by the image processing apparatus 20 but another image-quality degraded component, such as a distortion and a peripheral light quantity, may be corrected. The peripheral light quantity is a light quantity of the periphery of the taken image.

The taken image generator 10 may be a storage, a recording medium, or a personal computer configured to store the image data 12 and the image-pickup condition 14 generated by an image-pickup apparatus, such as a digital camera, or the image-pickup apparatus.

The image processing apparatus 20 includes a demosaicing processor 21, a color shift detector 22, an asymmetry characteristic acquirer 23, a memory 24, an OTF acquirer 25, a filter producer 26, a filtering processor 27, and a camera signal processor 28. The "OTF" stands for an optical transfer function.

The demosaicing processor 21 provides demosaicing processing to the image data 12.

The color shift detector 22 obtains a color shift amount of the whole screen from the image. More specifically, the color shift detector 22 detects a color shift amount between a reference color component, such as green, and a color component other than the reference color component, such as blue, at positions symmetrical with respect to the origin of the demosaiced image data 12, and outputs the detected result to the asymmetry characteristic acquirer 23.

The color shift detection performed by the color shift detector 22 may be made, for example, by applying a differential filter to the demosaiced image and by extracting an edge section of the image, and by obtaining a shift amount of the edge of each color component as the color shift amount. The color shift detector 22 may correct an image structure of the corrective color component using the image structure of the reference color component in the demosaicing, so as to facilitate a detection of the color shift amount. For example, in the Bayer arrangement that is used for the pixel arrangement of the light receiving element, the Nyquist frequency of the Gch (green channel) is higher than the Nyquist frequency of one of the Rch (red channel) and the Bch (blue channel), and thus the Gch is set as the reference color component. By correcting the image structures of Rch and Bch which are the color components other than the reference color component, Rch and Bch can be reproduced up to higher frequencies.

These techniques are disclosed in International Publication No. WO06/093266, and a detailed description thereof will be omitted.

The asymmetry characteristic acquirer 23 obtains a blur amount relating to the curvature of field corresponding to the shift amount caused by the lateral chromatic aberration obtained from the color shift detected by the color shift detector 22, by using the (correlation) relationship between the shift amount of the lateral chromatic aberration and the blur amount relating to the curvature of field, which corresponds to the image-pickup condition 14. The memory 24 previously stores the correlative relationship between the shift amount of the lateral chromatic aberration and the blur amount relating to the curvature of field. The blur amount relating to the curvature of field corresponds to a difference between an on-axis MTF peak position and an off-axis MTF peak position at the positions symmetrical with respect to the origin of the image. The MTF peak position is previously stored in the memory, and can be obtained by measuring a defocus characteristic of the MTF of the image-pickup optical system or the image-pickup apparatus. Alternatively, the MTF characteristic may be found through calculations.

Assume that "angle-of-view asymmetry" is defined as asymmetry of an imaging characteristic at the angles of field symmetrical with respect to the origin of the image is expressed as the angle-of-view asymmetry. Then, the shift amount caused by the lateral chromatic aberration and the blur amount relating to the curvature of field respectively correspond to the angle-of-view asymmetry of the lateral chromatic aberration and the angle-of-view asymmetry of the curvature of field. Also, assume that "azimuth asymmetry" is defined as an imaging characteristic that is asymmetrical in an azimuth direction in one angle of view, such as a coma, will be expressed as.

The origin set in the image is a point that determines a rotational axis of a rotationally symmetrical image, and may be the center of the image or a point of intersection between the optical axis of the image-pickup optical system and the light receiving element. In the latter case, the origin may be specified from the image based on the symmetry of the peripheral light quantity and the distortion.

Figure 2:
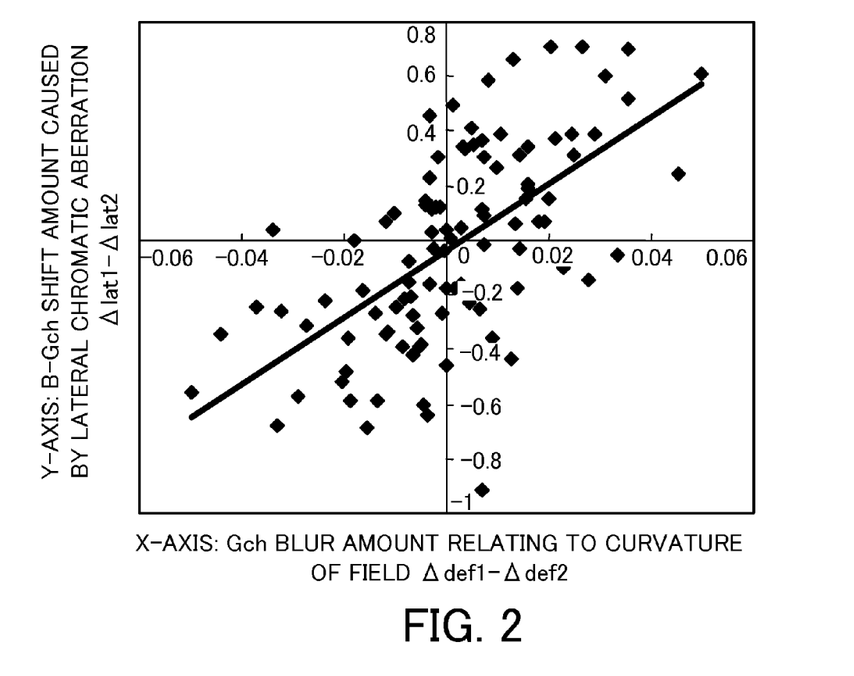
FIG. 2 is a graph illustrating a relationship between the asymmetry of a color shift amount and the asymmetry of a curvature of field.

FIG. 2 is a graph illustrating the relationship between the shift amount caused by the lateral chromatic aberration (angle-of-view asymmetry) and the blur amount relating to the curvature of field (angle-of-view asymmetry). The ordinate axis in FIG. 2 denotes a quantitative evaluation of the shift amount caused by the lateral chromatic aberration, and the abscissa axis in FIG. 2 denotes a quantitative evaluation of the blur amount relating to the curvature of field.

Figure 3A:
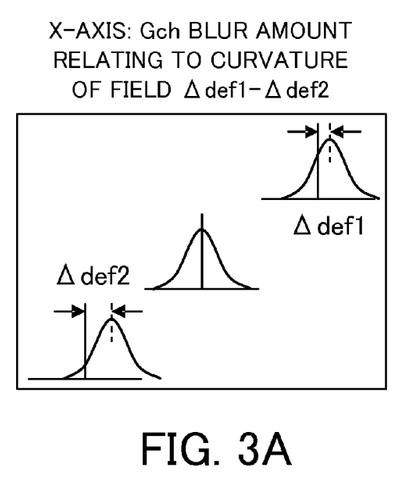
FIGS. 3A and 3B are views for explaining the ordinate axis and the abscissa axis of FIG. 2.
Figure 3B:
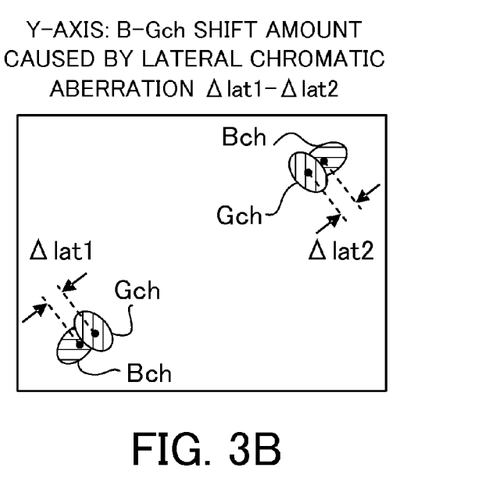

FIGS. 3A and 3B are explanatory diagrams of the ordinate axis and the abscissa axis illustrated in FIG. 2. FIG. 3A illustrates a difference between an on-axis MTF peak position and an off-axis MTF peak position at angles of view symmetrical with respect to the origin of the image. FIG. 3B illustrates a difference of a center of gravity spot between Bch and Gch at angles of view symmetrical with respect to the origin of the image.

Points illustrated in FIG. 2 represent lenses having different manufacturing errors, and FIG. 2 is a result of the above calculations for the 100 lenses. As illustrated in FIG. 2, the shift amount caused by the lateral chromatic aberration is related to the blur amount relating to the curvature of field. While FIG. illustrates an approximate curve (line) for these points, once a slope of this curve and the angle-of-view asymmetry of the color shift amount distinguished from the image are found, the angle-of-view asymmetry of the curve of field can be acquired. The order of the approximate curve is not limited.

Thus, according to this embodiment, the color shift detector 22 outputs a color shift amount, such as $\Delta lat1$ and $\Delta lat2$, at positions symmetrical with respect to the origin of the image, to the asymmetry characteristic acquirer 23. Then, the asymmetry characteristic acquirer 23 calculates a shift amount caused by the lateral chromatic aberration as a difference ($\Delta lat1 - \Delta lat2$), and obtains a blur amount relating to the curvature of field ($\Delta def1 - \Delta def2$) corresponding to the shift amount caused by the lateral chromatic aberration from the relationship illustrated in FIG. 2. Alternatively, the color shift detector 22 may calculate the difference ($\Delta lat1 - \Delta lat2$) as the shift amount caused by the lateral chromatic aberration and may output it to the asymmetry characteristic acquirer 23.

While this embodiment obtains a blur amount relating to the curvature of field from the angle-of-view asymmetry of the color shift amount, it is unnecessary to assign the difference of the color shift amount or the difference of the curvature of field to the axis at the positions symmetrical with respect to the origin, and the color shift amount and the blur amount relating to the curvature of field may be defined on the basis of the origin. As the target angle-of-view asymmetry, as discussed above, Siedel's five aberrations, such as the distortion, may be obtained as well as the curvature of field and the peripheral light quantity.

The relationship between the shift amount caused by the lateral chromatic aberration and the blur amount relating to the curvature of field may be expressed by a function (expression) or a table (database). Discrete data and interpolation processing may also be used.

This embodiment can reduce or eliminate the one-sided blur of the curvature of field that inevitably occurs due to manufacturing scatterings. In addition, since information used to correct the curvature of field can be obtained from the image, the correction becomes simpler and less expensive.

The memory 24 stores a relationship between color shift amounts at positions symmetrical with respect to the origin of the image corresponding to the image-pickup condition and blur amounts relating to the curvature of field at the positions symmetrical with respect to the origin. In this embodiment, in an example, the memory 24 stores the relationship between the shift amount caused by the lateral chromatic aberration and the blur amount relating to the curvature of field. The memory 24 further stores a plurality of filters each corresponding to an image-pickup condition 14. The plurality of filters are discretely arranged in the image-pickup condition space in which three conditions (such as a zooming position, an aperture diameter of a diaphragm, and an object distance) are set to the three axes. These filters are similar to, but not limited to, those disclosed in FIG. 3 of JP 2010-087672.

While the memory 24 may store a plurality of filters (filter coefficients), the memory 24 may store a plurality of functions instead of filters, such as an OTF or a PSF (point spread function) from which the filter can be generated.

The memory 24 may be configured volatile or nonvolatile. The above information may be previously stored in the memory 24 or updated through a network, such as the Internet, or temporarily stored.

The OTF acquirer 25 obtains the image-pickup condition 14, acquires the corresponding OTF by selecting it from the memory 24, and outputs it to the filter producer 26.

The filter producer 26 produces a filter used for asymmetrical image processing to the origin of the image so as to correct the blur amount relating to the curvature of field. In this embodiment, the filter producer 26 selects the best image restoration filter from among the plurality of filters stored in the memory 24 based on the OTF obtained by the OTF acquirer 25 so as to reduce the blur amount relating to the curvature of field.

The filtering processor 27 performs filtering processing using the filter that is rotationally asymmetrical to the origin. The filter is a two-dimensional filter having a plurality of taps, and may use a variety of filters, such as an edge enhancement filter, a smoothing filter, and an image restoration filter.

The following expression is established in the image restoring processing, where g(x,y) is a degraded image, f(x,y) is an original image, h(x,y) is a point spread function ("PSF") that is a Fourier transformation function of the OTF, "*" is convolution integral, and (x,y) is a coordinate on the image: g(x,y)=h(x,y)*f(x,y)

When this expression is Fourier-transformed and converted into an expression format on a frequency plane, a product for each frequency is obtained as follows where H is a Fourier-transformed PSF (or the OTF), G and F are Fourier-transformed g and f respectively, and (u,v) is a coordinate on the two-dimensional frequency plane and thus represents a frequency: G(u,v)=H(u,v)·F(u,v)

In order to obtain the original image from the degraded taken image, both sides may be divided by H as follows: G (u, v)/H (u, v)=F (u, v)

The original image f(x,y) is obtained as a restored image by reversely Fourier-transforming F(u,v) or G(u,v)/H(u,v).

Assume that R is a reverse Fourier transformation of 1/H. Then, the original image can also be obtained by the following convolution processing to the image on the real plane: g(x, y)*R(x, y)=f(x, y)

R(x,y) is an image restoration filter. When the image is two-dimensional, R(x,y) becomes a two-dimensional filter having taps (cells) each corresponding to each pixel. An illustrative two-dimensional filter is disclosed in FIGS. 4 and 5 of JP 2010-087672. Of course, a known Weiner filter or a known edge enhancement filter is applicable.

Figure 4:
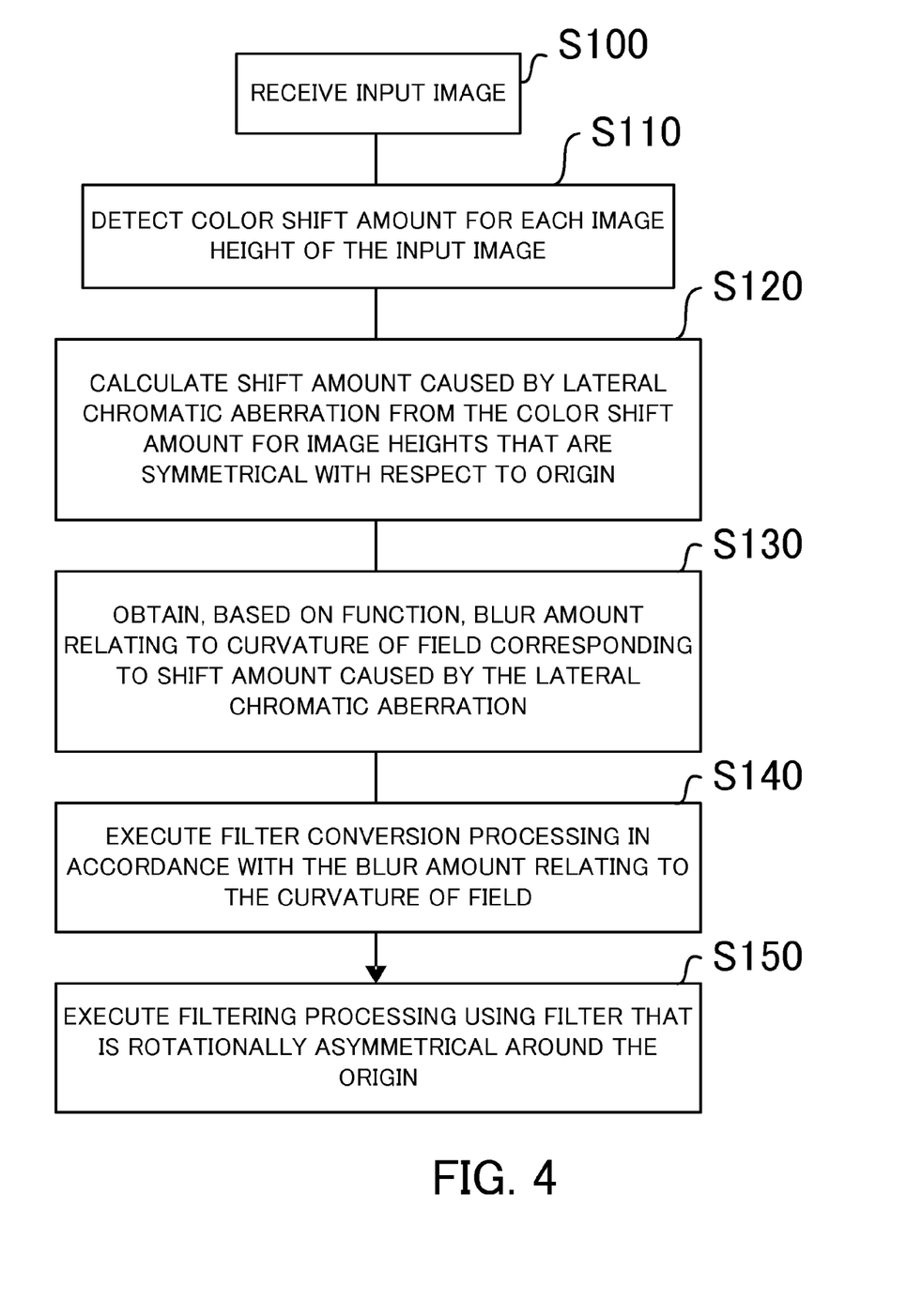
FIG. 4 is a flowchart for explaining an operation of the image processing apparatus illustrated in FIG. 1.

FIG. 4 is a flowchart for explaining an operation of the image processing apparatus 20, and "S" stands for the "step." This image processing method is stored in the memory 24, and can be implemented as a program executed by a microcomputer (processor) (not illustrated) of the image processing apparatus 20.

The image data 12 that is taken by the image-pickup apparatus (not illustrated) is input as an input image into the image processing apparatus 20 (S100). The image data 12 describes the optical system of the image-pickup apparatus and the image-pickup condition as EXIF information that specifies the zooming condition and the diaphragm condition in the photography. As a result, the image processing apparatus 20 obtains information of the image data 12 and the image-pickup condition 14.

When raw data is read out of the image data by the image processing apparatus 20, the image data 12 receives demosaicing processing by the demosaicing processor 21. Next, the color shift detector 22 detects a color amount for each image height of the image, such as Δlat1 and Δlat2 illustrated in FIG. 3B (S110).

Next, the asymmetry characteristic acquirer calculates a shift amount caused by the lateral chromatic aberration that is a difference of the color shift amounts detected by the color shift detector 22 (or Δlat1−Δlat2 corresponding to the ordinate axis in FIG. 2) (S120). Next, the asymmetric characteristic acquirer 23 calculates a blur amount relating to the curvature of field corresponding to the shift amount caused by the lateral chromatic aberration obtained from the relationship stored in the memory 24 corresponding to the image-pickup condition 14 (S130).

Figure 5:
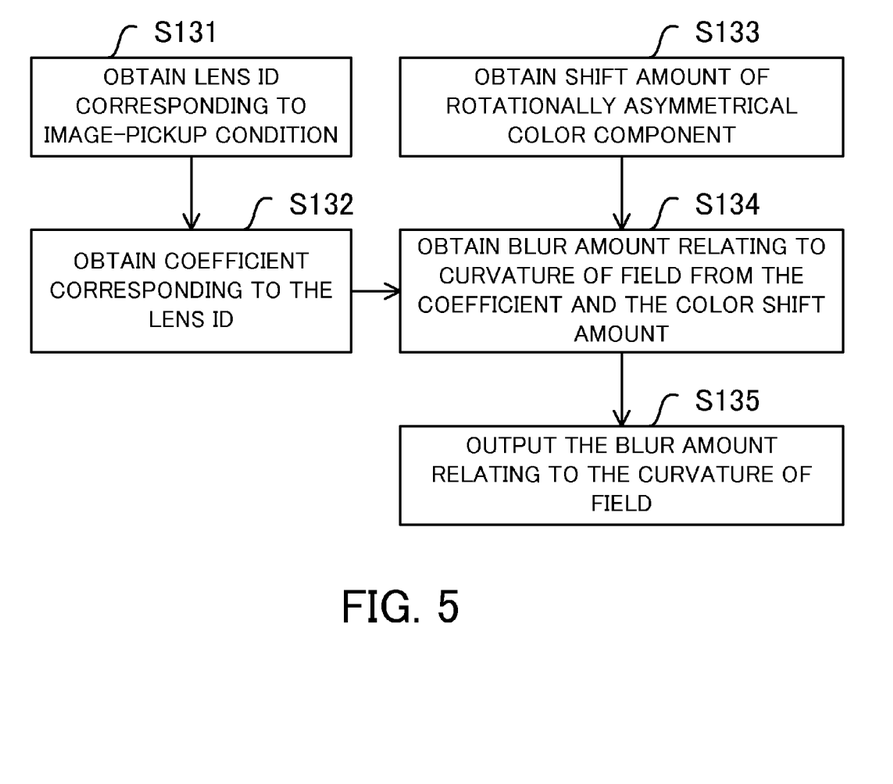
FIG. 5 is a flowchart for explaining details of S130 illustrated in FIG. 4.

FIG. 5 is a flowchart for explaining details of S130. Initially, the asymmetry characteristic acquirer 23 obtains a lens ID determined from the image-pickup condition 14, such as an identifier of the optical system (S131), and a corresponding function coefficient based on the lens ID (S132). The asymmetry characteristic acquirer 23 obtains a color shift amount detected by the color shift detector 22 (S133). Next, the asymmetry characteristic acquirer 23 obtains a blur amount relating to the curvature of field from the above function and the shift amount caused by the lateral chromatic aberration obtained from the color shift amount (S134), and outputs the result (S135).

The blur amount relating to the curvature of field found from the approximate curve as in FIG. 2 is a difference of the image-plane shift amount between two angles of field that are symmetrical to the origin. Since the actual curvature of field scatters between positive and negative values around the peak position of the designed value of this image height, almost half the above difference can be considered to be an absolute value of the shift amount from the designed value at respective angles of view that are symmetrical with respect to the origin.

Next, the filter producer 26 produces an image restoration filter that is asymmetrical with respect to the angles of view by changing a restoration gain using the OTF supplied from the OTF acquirer 25 so as to reduce the blur amount relating to the curvature of field (S140).

Next, the filtering processor 27 performs filtering processing using the produced restoring filter (S150), and an output image is output for which the camera signal processor 28 has performed camera signal processing, such as white balancing. As a result, the output image can be obtained in which the one-sided blur of the rotationally asymmetrical curvature of field caused by the manufacturing scattering has been corrected.

Figure 6:
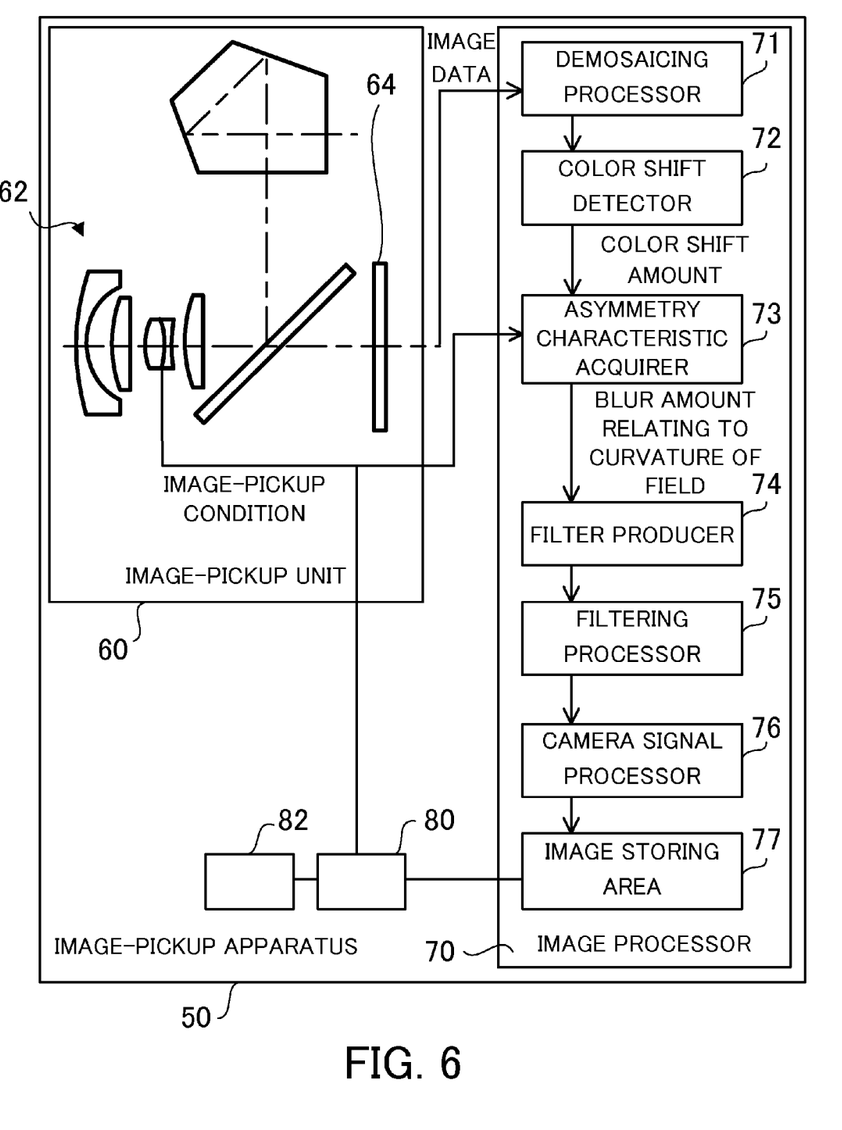
FIG. 6 is a block diagram of a variation of the image processing apparatus illustrated in FIG. 1.

The image processing apparatus 20 may be incorporated into the image-pickup apparatus. FIG. 6 is a block diagram illustrating such an image-pickup apparatus 50. The image-pickup apparatus 50 includes an image-pickup unit 60, an image processor 70, and a controller 80.

The image-pickup unit 60 includes an image-pickup optical system 62 configured to form an optical image of an object, and an image-pickup element 64 configured to generate image data by photoelectrically converting the optical image.

The image processor 70 serves as the image processing apparatus 20.

The controller 80 controls operations of the image-pickup unit 60 and the image processor 70. The image-pickup condition 14 may be incorporated into the image data 12 or the controller 80 may supply the image-pickup condition 14 to the image processor 70. The image processing method is executed by the image processor 70 under control of the microcomputer (processor) that constitutes the controller 80. The controller 80 is connected to a memory 82 that serves as the memory 24.

In FIG. 6, the memory 82 stores the relationship between the angle-of-view asymmetry of the lateral chromatic aberration and the angle-of-view asymmetry of the curvature of field as a format of the lookup table rather than the function illustrated in FIG. 2. In addition, the memory 82 stores a plurality of filters each of which is suitable for the image-pickup condition 14. Alternatively, the memory 82 may store a plurality of OTFs suitable for the image-pickup condition 14. In addition, the memory 82 stores the image processing program.

FIG. 6 utilizes an edge enhancement filter instead of the image restoration filter. The image processor 70 includes a demosaicing processor 71 corresponding to the demosaicing processor 21, a color shift detector 72 corresponding to the color shift detector 22, an asymmetry characteristic acquirer 73 corresponding to the asymmetry characteristic acquirer 23, a filter producer 74, a filtering processor 75 corresponding to the filtering processor 27, and a camera signal processor 76 corresponding to the camera signal processor 28, and an image storing area 77 configured to store an image that has undergone the above elements.

This embodiment performs filtering processing using the edge enhancement filter so as to reduce the load of the image processing. Usually, the edge enhancement processing causes amplified noises. Accordingly, filtering processing is executed with an extracted edge of an image or a smoothing filter. This embodiment produces an edge enhancement filter that is asymmetrical with respect to an angle of view in accordance with the asymmetry characteristic, and executes the filtering processing. Since the operation of each component in the image processor 70 is similar to the image processing apparatus 20, a detailed description thereof will be omitted.

A detailed description will be given of the relationship stored in the memory 24 in this embodiment. The relationship illustrated in FIG. 2 of this embodiment is a calculation result using one hundred exchange lenses of a specific type, such as a lens A. Since a plurality of types of exchange lenses having different aberration amounts, the memory 24 may store the relationship calculated using the 100 exchange lenses, such as the lens B. The image processor 70 may obtain the relationship corresponding to the lens ID and execute the image processing based on the relationship. This configuration can properly correct the curvature of field for a variety of exchange lenses. The above lens ID is an identifier to distinguish the lens A from the lens B.

The relationship stored in the memory 24 is not limited to that obtained in the above method. For example, the memory 24 may store a coefficient of an approximate curve found from the relationship calculated using a proper number (for example, 100) of exchange lenses, such as lenses A and C, which generate similar aberrations. In other words, even for different lens identifiers (which contain information used to specify the lenses A and C), if an image is taken using the lens having a similar aberration, the above coefficient may be used by selecting it from the memory 24 and the image processing is executed using the re-constructed relationship using the coefficient. This configuration can prevent the capacity of the memory 24 from increasing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2011-041730, filed Feb. 28, 2011, and 2011-265702, filed Dec. 5, 2011, which are hereby incorporated by reference herein in their entirety.

What is claimed is:

1. An image processing apparatus configured to process an image taken by an image-pickup unit, the image processing apparatus comprising:

a memory configured to store a relationship between a color shift amount at positions that are symmetrical with respect to an origin of an image and a blur amount relating to a curvature of field at the positions symmetrical with respect to the origin of the image;

a detector configured to detect a color shift amount at the positions that are symmetrical with respect to the origin of the image;

an acquirer configured to acquire the blur amount relating to the curvature of field corresponding to the color shift amount detected by the detector based on the relationship stored in the memory; and a processor configured to execute image processing that is asymmetrical with respect to the origin so as to correct the blur amount relating to the curvature of field acquired by the acquirer.

2. The image processing apparatus according to claim 1, wherein the color shift amount is a shift amount caused by a lateral chromatic aberration.

3. The image processing apparatus according to claim 1, wherein the detector detects as the color shift amount a shift amount between a reference color component that is green and another color component.

4. The image processing apparatus according to claim 1, wherein the relationship is expressed by a function.

5. The image processing apparatus according to claim 4, wherein a coefficient of the function is determined by an identifier of an optical system of the image-pickup unit.

6. The image processing apparatus according to claim 1, wherein the relationship is expressed by a table.

7. The image processing apparatus according to claim 1, wherein the relationship corresponds to an image-pickup condition.

8. An image-pickup apparatus comprising an image processing apparatus according to claim 1.

9. An image processing method configured to process an image taken by an image-pickup unit, the image processing method comprising the steps of:

detecting a color shift amount at positions that are symmetrical with respect to an origin of an image;

acquiring a blur amount relating to a curvature of field corresponding to the color shift amount detected by the detecting step using a memory configured to store a relationship between the color shift amount at positions that are symmetrical with respect to the origin of the image and the blur amount relating to the curvature of field at the positions symmetrical with respect to the origin of the image; and executing image processing that is asymmetrical with respect to the origin so as to correct the blur amount relating to the curvature of field acquired by the acquiring step.

10. A non-transitory computer-readable storage medium including a computer executable program for enabling a computer to execute an image processing method configured to process an image taken by an image-pickup unit, the image processing method comprising the steps of:

detecting a color shift amount at positions that are symmetrical with respect to an origin of an image;

acquiring a blur amount relating to a curvature of field corresponding to the color shift amount detected by the detecting step using a memory configured to store a relationship between the color shift amount at positions that are symmetrical with respect to the origin of the image and the blur amount relating to the curvature of field at the positions symmetrical with respect to the origin of the image; and executing image processing that is asymmetrical with respect to the origin so as to correct the blur amount relating to the curvature of field acquired by the acquiring step.

* * * * *